Figure 1:
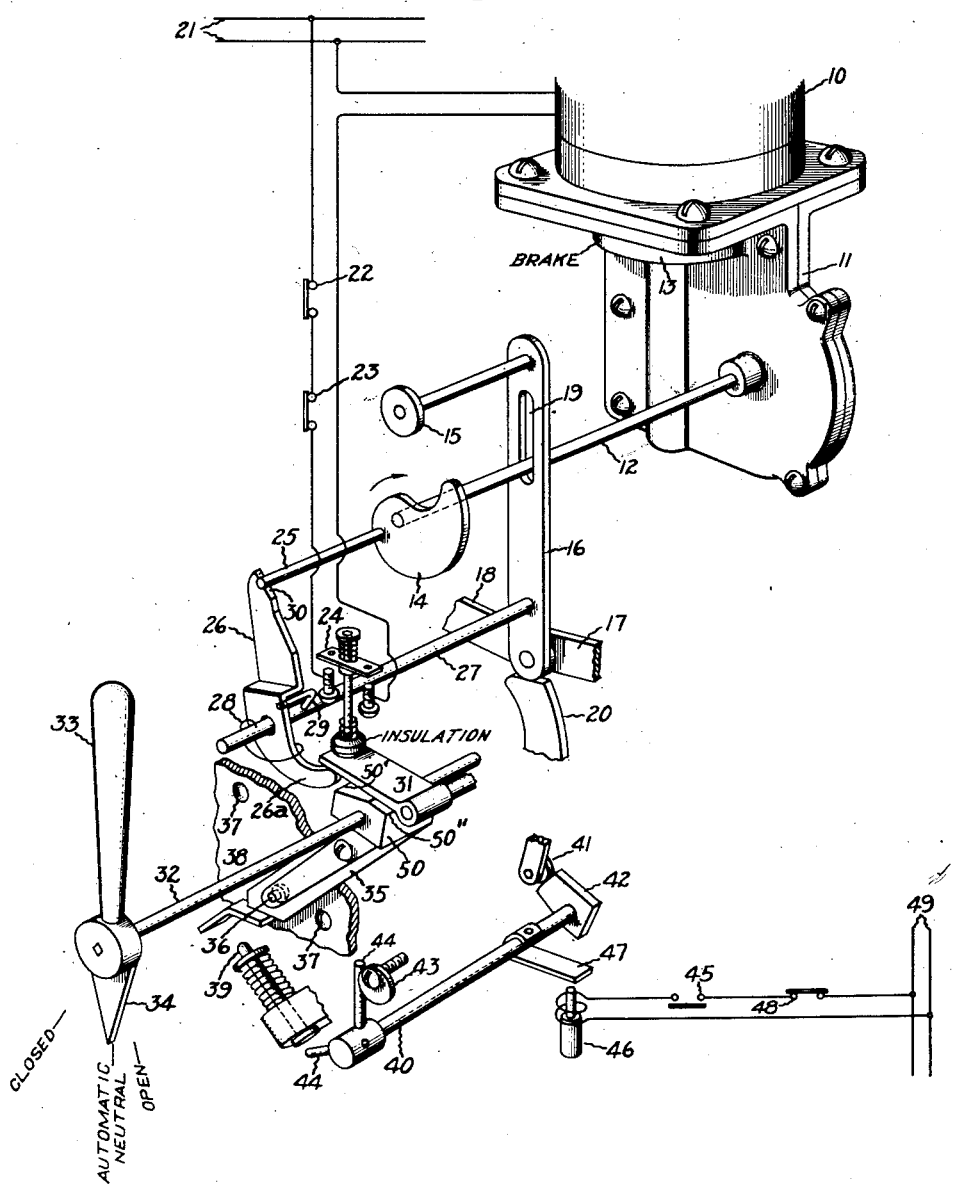

Inventor:
Leonard J. Linde,
by Harry E. Dunham
His Attorney.

Jan. 21, 1941.  L. J. LINDE  2,229,464
CIRCUIT-BREAKER OPERATING AND CONTROL MEANS
Filed June 7, 1940  3 Sheets-Sheet 3

Inventor:
Leonard J. Linde,
by Harry E. Dunham
His Attorney.

Patented Jan. 21, 1941

2,229,464

UNITED STATES PATENT OFFICE 2,229,464

CIRCUIT-BREAKER OPERATING AND CONTROL MEANS

Leonard J. Linde, Drexel Hill, Pa., assignor to General Electric Company, a corporation of New York Application June 7, 1940, Serial No. 339,298

8 Claims. (Cl. 200—50)

My invention relates to circuit breaker operating and control means and more particularly to motor-actuated operating and control means for electric circuit breakers.

In motor-operated circuit breakers, it is highly desirable that overrunning or overtravel of the actuating mechanism be prevented except within comparatively narrow limits so that the operating mechanism may be readily tripped, reset, and reclosed, if necessary, without interference from any of the operating parts. In many of the prior-art motor-operated circuit breakers, the inertia of the moving parts after deenergization of the motor made it very difficult to control the final position of the operating mechanism. Suitable braking means are, therefore, usually provided to stop the motor-actuated mechanism substantially at the position where the circuit-closing operation is completed. It is, of course, essential that the motor must be energized for a sufficient time to insure positive closing of the circuit breaker and the braking means must commence operation immediately upon deenergization of the motor. Since high-speed series motors are generally used with such apparatus, it is important that deenergization of the motor occurs at the end of the closing interval since otherwise destructive speeds thereof might result in the event the braking means should fail to operate.

To accomplish the above results, complicated mechanisms and control means have been provided particularly in connection with network protectors, which are very expensive but which expense could be justified when used with large capacity networks serving heavily loaded areas. However, it would be desirable to provide operating and control means for motor-operated circuit breakers suitable for use as network protectors associated with networks serving lightly loaded areas where the economics of the situation would not justify the expensive and complicated network protectors of the prior art.

Accordingly, it is an object of my invention to provide a new and improved operating and control means for a motor-operated circuit breaker suitable for use as a network protector which is efficient and reliable in operation, simple and compact in design, rugged in construction, and relatively inexpensive compared to similar devices available heretofore.

It is another object of my invention to provide a new and improved operating and control means for a motor-operated circuit breaker including a limit switch for preventing overrunning or overtravel of the operating mechanism, which switch is automatically opened when the circuit breaker is manually controlled.

Further objects and advantages of my invention will become apparent as the following description proceeds and the features of novelty which characterize my invention will be pointed out with particularity in the claims annexed to and forming a part of this specification.

Figure 2:
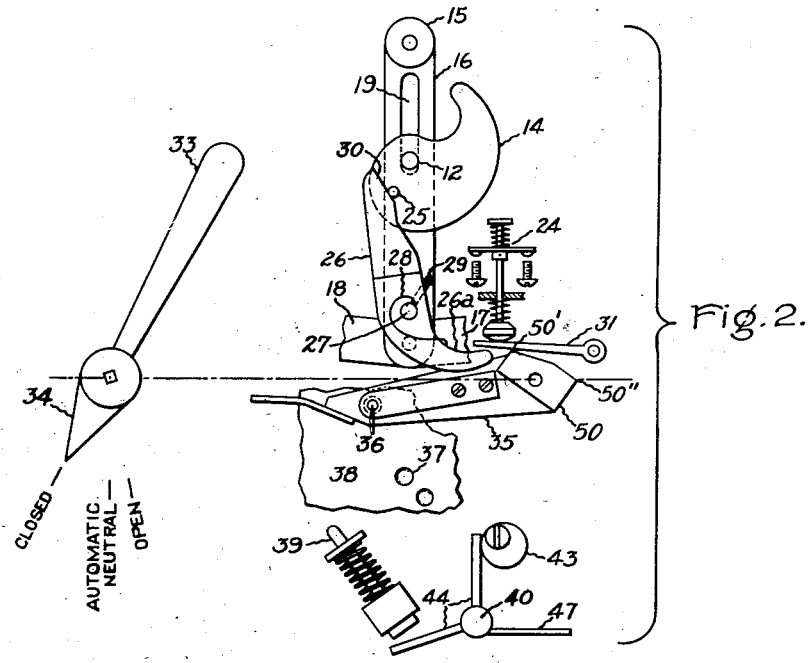
Figure 3:
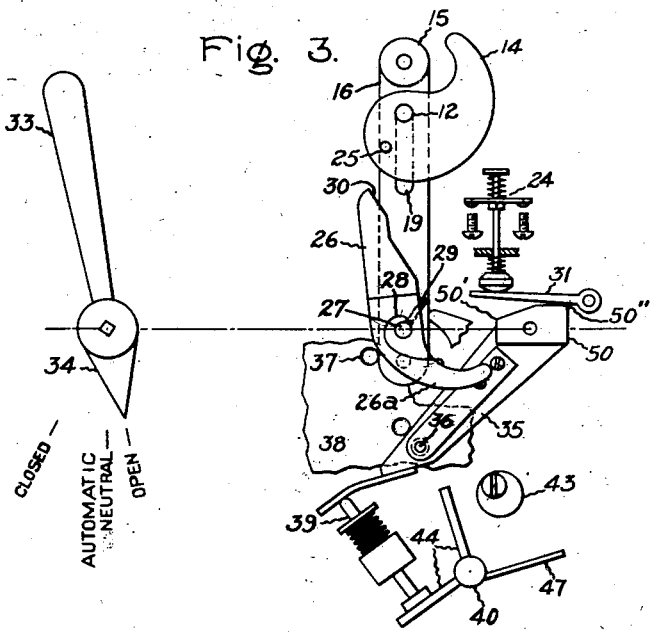
Figure 4:
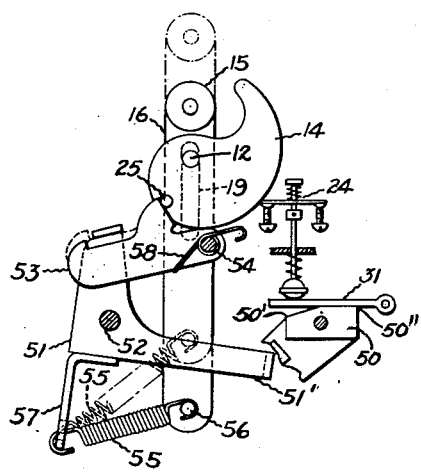
Figure 5:
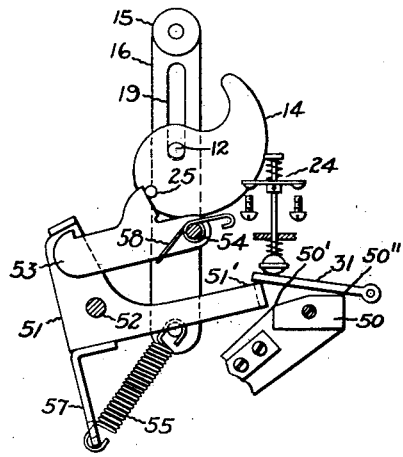
Figure 6:
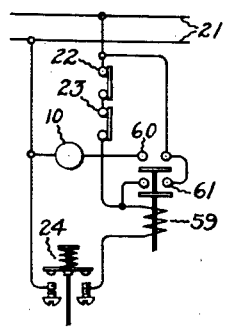

For a better understanding of my invention, reference may be had to the accompanying drawings in which Fig. 1 is a perspective view illustrating the operating and control means embodying the present invention, Figs. 2 and 3 are partial views of the apparatus of Fig. 1 illustrating different operating positions thereof, Figs. 4 and 5 illustrate two different operating positions of a modification of the arrangement disclosed in Fig. 1, and Fig. 6 is a control circuit which may be employed in connection with the present invention.

Although my operating and control means may be used generally with various types of circuit breakers, my invention is specifically applicable to a circuit-breaker operating mechanism such as is disclosed and claimed in United States Letters Patent 2,152,453 to W. A. Atwood et al., granted March 28, 1939, and assigned to the assignee of the present application, and more particularly to the motor-actuated circuit breaker disclosed in copending application Serial No. 257,914, filed February 23, 1939, by Atwood and Seaman for "Circuit-breaker operating mechanism" also assigned to the same assignee as the present application. Since I have applied my operating and control means to a circuit breaker and operating mechanism substantially identical with that disclosed in the above-mentioned patent to Atwood et al., I have not illustrated the circuit breaker in the drawings and only a small portion of the operating mechanism is shown for they form no part of the present invention.

Referring more particularly to Fig. 1, I have illustrated a motor unit 10 for actuating a circuit-breaker closing mechanism comprising a vertically positioned rotor shaft connected through suitable gearing, contained within gear housing 11, to cam shaft 12. The motor unit 10 is provided with a self-contained brake 13 which preferably is of the type including a lost-motion connection so as to commence braking action immediately upon deenergization of motor 10. The specific details of the brake and motor structures form no part of the present invention and are omitted in the interest of clearness. By way of example, the motor and brake structures can be of the character disclosed and claimed in my prior United States Letters Patent 2,034,145 granted March 17, 1936, for "Operating mechanism."

In order that motor 10 may actuate a circuit breaker, not shown, to the closed position, a cam 14 of suitable design is provided on cam shaft 12 and is arranged to be actuated in a clockwise direction, as indicated by the arrow in Fig. 1, upon energization of motor 10. The cam follower 15 comprising a roller is suitably connected to a vertically movable link 16 connected to the toggle joint of a pair of interconnected links 17 and 18 which form part of the operating mechanism of the circuit breaker, not shown. These links 17 and 18 are identical with the corresponding parts shown in the Atwood et al. patent and copending application referred to above. Vertically movable link 16 is slotted as indicated at 19 to receive cam shaft 12, whereby link 16 is guided for reciprocal rectilinear movement by cam shaft 12. Rotation of cam 14 in a clockwise direction causes elevation of cam follower 15 and vertically movable link 16 so as to close the circuit breaker, not shown, which is preferably identical with that disclosed and claimed in the above-mentioned Atwood et al. patent. In Fig. 1, the operating mechanism is shown in the closed position of the circuit breaker with the prop 20 holding vertically movable link 16 in the upward position even though cam 14 has rotated to be free of cam follower 15. As described in the above-mentioned patent to Atwood et al., prop 20 is suitably associated by means not shown with the tripping shaft of the circuit breaker to facilitate resetting of the prop and latching means after a circuit-opening or releasing operation of the operating mechanism.

Since my present invention is particularly applicable for use in connection with network protectors, I have illustrated motor 10 as energized from a suitable source of potential 21 through the closing contacts 22 of a power directional network relay, the contacts 23 of a network-phasing relay, and a limit switch 24, the operation of which will be described in greater detail hereinafter. It will be understood that the circuit breaker, not shown, when used as a network protector will not automatically interconnect the feeder and network which it protects unless the phase relationships of the electrical quantities involved and the direction of power flow are proper. In Fig. 1, where cam follower 15 is shown in the upward position indicating that the circuit breaker associated therewith is closed, motor 10 is deenergized through the opening of limit switch 24, which operation is described in greater detail hereinafter.

In motor-operated cam mechanisms as described above, it is essential that overrunning or overtravel of the actuating cam be prevented except within comparatively narrow limits so that the operating mechanism may be readily tripped, reset, and reclosed, if necessary, without interference by the actuating cam 14. Accordingly, means must be provided for energizing motor 10 to produce a predetermined rotation of cam 14, after which the motor is deenergized and the rotating parts brought to a quick stop by the automatic brake indicated at 13. Therefore, I provide a pin 25 suitably positioned on operating cam 14 for engaging limit-switch operating cam 26 suitably mounted on a shaft 27 supported by vertically movable link 16. Limit-switch operating cam 26 is provided with a clockwise biasing spring 28, the action of which is limited by a suitable stop 29. One end of limit-switch operating cam 26 is provided with a cam surface 30 which is engaged by pin 25 associated with operating cam 14 to cause counterclockwise rotation thereof against the bias of spring 28. The other end 26a of cam 26 is arranged under certain conditions to engage with intermediate pivotally mounted member 31, the purpose of which will be set forth in greater detail hereinafter, to cause upward movement thereof so as to open limit switch 24. It will be observed that the end 26a of the cam 26 engages with intermediate member 31 only in the upward position of vertically movable link 16 when pivoted in a counterclockwise direction by virtue of pin 25 associated with rotating operating cam 14.

In addition to automatic control of the circuit-breaker operating mechanism, it is also desirable to provide manual control thereof during which time it is essential that motor 10 should remain unenergized regardless of the condition of the network relays. Accordingly, I provide a manually operable circuit breaker closing shaft 32 arranged to close the circuit breaker, not shown, by clockwise rotation thereof to one extreme position. A suitable handle 33 is attached to shaft 32 to facilitate operation thereof. As will be described, shaft 32 may assume two other positions, e. g., an intermediate position permitting automatic operation of the apparatus and the other extreme position of shaft 32 when rotated in a counterclockwise direction to cause manual tripping of the circuit breaker. Handle 33 is provided with a pointer 34 associated with the proper indicia for indicating the particular position of shaft 32 and, hence, also the condition of the circuit-breaker operating and control means. In order to hold shaft 32 in the particular position in which it is set, an extension 35 is provided therefor including a spring-pressed pin 36 arranged to enter suitable recesses 37 in the housing 38 enclosing the apparatus, only a small portion of which is shown. When handle 33 is rotated in a counterclockwise direction to its extreme position, as shown in Fig. 3, tripping of the circuit breaker is accomplished through extension 35 engaging with spring-pressed trip plunger 39 to cause rotation of tripping shaft 40 and release of breaker trip latch 41 which is held in the position shown by detent 42 mounted on trip shaft 40. The amount of latching of the circuit breaker is controlled by adjustable stop 43 engaging with one of the extensions 44 of trip shaft 40.

The circuit breaker, not shown, may also be tripped automatically upon closure of the tripping contacts 45 of the network power directional relay, not shown. It will be understood, of course, that closing contacts 23 and tripping contacts 45 of this relay are simultaneously operated to opposite positions. A suitable solenoid 46 for causing tripping rotation of trip shaft 40 through engagement with extension 47 is arranged to be energized through contacts 45 and auxiliary switch 48 from source of potential 49. It will be understood by those skilled in the art that switch 48 is the so-called "a" switch arranged to be closed when the circuit breaker is closed and open when the circuit breaker is open.

In order to insure deenergization of motor 10 when operating handle 33 is in either of its extreme positions for manual control of the operating and control means of the circuit breaker, I provide on shaft 32 a block 50, so positioned that the front edge 50' causes rotation of intermediate pivotally mounted member 31 to open limit switch 24 when handle 33 is rotated in a clockwise direction to its extreme position as shown in Fig. 2 and an edge 50" for engaging intermediate member 31 to open limit switch 24 when handle 33 is rotated in a counterclockwise direction to its extreme position as shown in Fig. 3. In the intermediate position of handle 33, there is sufficient clearance between block 50 and intermediate member 31 so that limit switch 24 may be automatically controlled through its cam 26.

In Fig. 1, manual handle 33 is set for automatic operation of the motor-actuated circuit breaker in response to the network relays and limit switch 24 is controlled exclusively by cam 26. In Fig. 2, on the other hand, the operating parts of the circuit breaker are shown in the same position as in Fig. 1 except that handle 33 has been rotated in a clockwise direction to close the circuit breaker manually and, consequently, the edge 50' of block 50 engages intermediate member 31 to open limit switch 24 whereas the end 26a of limit-switch operating cam 26 is not effective to operate limit switch 24.

In Fig. 3, I have illustrated handle 33 as rotated to its extreme counterclockwise position whereupon extension 34 has engaged spring-pressed tripping pin 39 thereby causing rotation of tripping shaft 40 so that the circuit breaker is in the open position and cam follower 15 and limit-switch operating cam 26 are in their lowermost positions. However, the edge 50" of block 50 engages intermediate member 31 to open limit switch 24, thereby precluding energization of actuating motor 10.

The operation of the control and operating means illustrated in Figs. 1 to 3 will be understood by those skilled in the art in view of the detailed description included above. When manual lever or handle 33 is moved to either of its extreme positions, the circuit breaker, not shown, is either manually closed or tripped and block 50 acting on intermediate pivotally mounted member 31 holds limit switch 24 in the open position, preventing energization of motor 10 regardless of the condition of the network relays. However, when handle 33 is moved to the intermediate position, the motor cut-off switch 24 is closed unless it is automatically opened through the action of its cam 26 when operating cam 14 reaches a predetermined position. In any event, cut-off switch 24 is automatically opened when handle 33 is in other than its intermediate position. Exclusive of manual operation, therefore, limit switch 24 is arranged to open its contacts only when the circuit breaker, not shown, is closed and the operating cam 14 is in a position where it cannot interfere with cam follower 15 and the associated trip-free mechanism of the circuit breaker.

In order to eliminate the necessity of accurate adjustment of limit-switch cam 26 which would be required in connection with Figs. 1 to 3, I have illustrated in Figs. 4 and 5 a modification of my invention retaining the same reference numerals for the corresponding parts of Fig. 1 wherein cam 26 has been replaced by two members, namely, tripping member 51, rotatably supported by fixed pivot 52, and a catch 53 supported by fixed pivot 54. A suitable spring 55 is provided having one end thereof associated with a pin 56 mounted on vertically movable link 16 while the other end thereof engages with an extension 57 on tripping lever 51. When the circuit breaker is open and link 16 is in its lowermost position, as indicated by the solid lines of Fig. 4, spring 55 is unstressed and gravity holds tripping lever 51 in the position shown so that the end 51' thereof does not engage intermediate pivotally mounted member 31 to open limit switch 24. Latch 53 is provided with a clockwise biasing spring 58 so as to cause it to latch tripping lever 51 as shown by the dotted lines. However, when pin 25 of cam 14 is in the position indicated in Fig. 4 before the circuit-closing operation is initiated, latch 53 is moved sufficiently so that tripping lever 51 would be free to pivot in a counterclockwise direction if any tension were provided by spring 55. Upon rotation of cam 14 in a clockwise direction, cam follower 15 and link 16 are raised to the dotted position shown in Fig. 4 and, when pin 25 again comes around to the position shown by Fig. 4, latch 53 is freed from tripping lever 51 so that spring 55, now under tension as shown dotted in Fig. 4, causes counterclockwise rotation of tripping member 51 so that the end 51' thereof engages with intermediate pivotal member 31 to open limit switch 24 whereupon motor 10 is deenergized and brake 13 causes stopping of cam 14 within a very short space of time.

The operation of the arrangement illustrated in Figs. 4 and 5 will be obvious to those skilled in the art and it will be understood that, when the circuit breaker is tripped from the position shown in Fig. 5, the tension on spring 55 will be removed and gravity will cause tripping lever 51 to move to the position shown solid in Fig. 4. The arrangements shown in Figs. 4 and 5 eliminate the necessity of accurate adjustment of the parts and, furthermore, cause limit switch 24 to open at a higher speed.

In order to prevent the opening of one of the network relays from interrupting the motor circuit prior to one complete operation thereof, it may be desirable to provide a control circuit such as shown in Fig. 6 for motor 10. The corresponding parts of this circuit, similar to those shown in Fig. 1, are designated by the same reference numerals. When limit switch 24 is closed and the network relays have closed their contacts 22 and 23, a relay 59 is energized to close contacts 60 for energizing motor circuit 10 as well as contacts 61 which provide a seal-in circuit for relay 59 in parallel with the relay contacts 22 and 23. It will be obvious, therefore, that even though contacts 22 should open prior to complete closing of the circuit breaker, not shown, nevertheless motor 10 will be energized until cam 14 has returned to its initial position when limit switch 24 opens and the apparatus is ready for the next closing operation.

While I have shown and described particular embodiments of my invention, it will be obvious to those skilled in the art that changes and modifications may be made to the arrangements disclosed and I, therefore, aim in the appended claims to cover all such changes and modifications as fall within the true spirit and scope thereof.

What I claim as new and desire to secure by Letters Patent of the United States is:

1. In an operating mechanism for an electric circuit breaker comprising a motor, a rotatable shaft having a circuit-breaker actuating cam mounted thereon, said shaft being operatively connected to said motor, an energizing circuit for said motor including a motor cut-off switch which is automatically opened when said cam has reached a predetermined angular position, and a manually operated shaft having a plurality of positions provided with means for opening said cut-off switch when said shaft is in at least two of said plurality of positions.

2. In an operating and control means for an electric circuit breaker comprising a motor, a rotatable shaft operatively connected to said motor having means for actuating said circuit breaker, an energizing circuit for said motor including a limit switch, a manually operated shaft provided with a neutral position and a position on either side thereof for manually closing and tripping said circuit breaker, and means for automatically controlling said limit switch when said manually operated shaft is in said neutral position to de-energize said motor when said circuit breaker is closed.

3. In a motor-operated circuit breaker, a motor for closing said circuit breaker, an energizing circuit for said motor, a limit switch for automatically opening said energizing circuit when said motor has moved said circuit breaker to the closed position, and means for holding said limit switch in the open position when said circuit breaker is manually operated.

4. In an operating and control means for an electric circuit breaker comprising a motor for automatically closing said circuit breaker, an energizing circuit for said motor including a limit switch, a manually operable lever, means for closing said circuit breaker when said lever is moved in one direction, means for tripping said circuit breaker when said lever is moved in the opposite direction, a neutral position of said lever so that said circuit breaker may be automatically operated by said motor, and means for holding said limit switch in the open position when said manually operable lever is in other than its neutral position.

5. In an operating mechanism for an electric circuit breaker comprising a motor, a rotatable shaft having a circuit-breaker actuating cam mounted thereon, said shaft being operatively connected to said motor, an energizing circuit for said motor including a motor cut-off switch, a pivotally mounted member for opening said switch, and means including a pin on said circuit-breaker actuating cam for causing said member to open said switch when said actuating cam has reached a predetermined angular position.

6. In an operating mechanism for an electric circuit breaker comprising a motor, a rotatable shaft having a circuit-breaker actuating cam mounted thereon, said shaft being operatively connected to said motor, an energizing circuit for said motor including a motor cut-off switch, means for opening said cut-off switch when said cam has reached a predetermined angular position indicating the closed position of said circuit breaker, and means for closing said cut-off switch in response to opening of said circuit breaker regardless of the angular position of said cam.

7. Operating and control means for an electric motor-operated circuit breaker comprising a motor, a rotatable shaft having a circuit-breaker actuating cam mounted thereon operatively connected to said motor, an energizing circuit for said motor including a normally closed limit switch, a pivotally mounted member supported by said circuit-breaker operating structure arranged to open said limit switch when moved to a predetermined position, a pin supported on said actuating cam for engaging said pivotally mounted member to cause it to open said limit switch when said circuit breaker is closed as determined by a particular angular position of said cam, and means for closing said cut-off switch in response to opening of said circuit breaker regardless of the angular position of said cam.

8. Operating and control means for an electric motor-operated circuit breaker comprising a motor, a rotatable shaft having a circuit-breaker actuating cam mounted thereon operatively connected to said motor, an energizing circuit for said motor including a normally closed limit switch, a pivotally mounted member supported by said circuit-breaker operating structure arranged to open said limit switch when moved to a predetermined position, a pin supported on said actuating cam for engaging said pivotally mounted member to cause it to open said limit switch when said circuit breaker is closed as determined by a particular angular position of said cam, a manually operated shaft provided with two extreme positions and a neutral position, means for closing said circuit breaker when said manually operated shaft is moved to one extreme position, means for tripping said circuit breaker when said manually operated shaft is moved to the said other extreme position, means for opening said limit switch when said shaft is in either of its extreme positions, and means for automatically controlling said circuit breaker through said limit switch when said manually operated shaft is in the neutral position.

LEONARD J. LINDE.